US006425289B1

(12) United States Patent
Igel et al.

(10) Patent No.: US 6,425,289 B1
(45) Date of Patent: Jul. 30, 2002

(54) CAPACITIVE SENSOR

(75) Inventors: Guenter Igel, Teningen; Ulrich Sieben, Reute; Juergen Giehl, Kirchzarten, all of (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/293,067

(22) Filed: Apr. 16, 1999

(30) Foreign Application Priority Data

Apr. 17, 1998 (DE) .......................................... 198 17 172
Dec. 19, 1998 (DE) .......................................... 198 58 828

(51) Int. Cl.[7] ................................................. G01L 7/08
(52) U.S. Cl. ....................................................... 73/715
(58) Field of Search ............................ 73/715, 716, 717, 73/718, 719, 720, 721, 722, 723, 724 R, 725–728; 361/283.4, 283.1, 283.2, 283.3

(56) References Cited

U.S. PATENT DOCUMENTS

| | | | | |
|---|---|---|---|---|
| 4,495,820 A | * | 1/1985 | Shimadaet | 73/724 |
| 4,730,496 A | * | 3/1988 | Knecht et al. | 73/724 |
| 5,001,595 A | * | 3/1991 | Dittrich et al. | 361/283 |
| 5,349,492 A | * | 9/1994 | Kimura et al. | 361/283.4 |
| 5,511,428 A | | 4/1996 | Goldberg et al. | 73/777 |
| 5,836,063 A | * | 11/1998 | Hegner et al. | 29/25.42 |
| 6,029,524 A | * | 2/2000 | Klauder et al. | 73/718 |

FOREIGN PATENT DOCUMENTS

| | | |
|---|---|---|
| DE | 33 10 643 A1 | 10/1984 |
| DE | 37 34 023 C2 | 4/1989 |
| DE | 42 31 120 | 3/1994 |
| DE | 43 08 132 A1 | 9/1994 |
| EP | 0 041 693 A1 | 12/1981 |
| EP | 0 455 070 A1 | 11/1991 |
| JP | 60-86413 | 5/1985 |
| WO | WO 96/ 13705 | 5/1996 |

* cited by examiner

*Primary Examiner*—Benjamin R. Fuller
*Assistant Examiner*—Abdullahi Aw-musse
(74) *Attorney, Agent, or Firm*—Foley Hoag LLP

(57) ABSTRACT

A capacitive sensor is described which includes a first electrode remote from a second electrode, wherein the first electrode and the second electrode form a measurement capacitance. The first electrode is arranged on a first substrate member and the second electrode is arranged on a second substrate member. At least one of the electrodes has a spatially resolved structure which allows a spatially resolved measurement of the capacitance. The spatial structure of the electrode may be implemented in form of several mutually parallel stripe-shaped elements or in form of a plurality of spaced-apart elements that are arranged in a two-dimensional pattern. Associated with the electrodes are electronic processing units integrated in the substrate members.

25 Claims, 3 Drawing Sheets

CAPACITIVE SENSOR

BACKGROUND OF THE INVENTION

1. Field of the Invention

This application relates to the field of electronic sensors and more particularly to the field of capacitive sensors for measuring flow and pressure.

2. Description of Related Art

A capacitive sensor for measuring pressure and flow of liquids and gases typically includes a first electrode located remote from a second electrode, with the first and the second electrodes forming a measurement capacitance. At least the first electrode is formed as a membrane which can be deformed by a pressure applied to the membrane.

A sensor of this type is described in DE 33 10 643 and can be employed for measuring both absolute and relative pressures. The sensor, however, cannot provide any additional and/or more detailed information. It is therefore desirable to provide a capacitive sensor which can provide differentiated information about a measurement quantity.

SUMMARY OF THE INVENTION

In general, according to one aspect of the invention, at least one electrode of a sensor of this type is formed with a spatial structure to allow measurements providing spatial resolution.

By measuring a spatially differentiated capacitance value or capacitance values of the electrodes, a significantly improved differentiated information about measurement quantity or also about the condition of the sensor itself can be obtained. For example, a flow profile of a fluid or a gas flowing through the measurement capacitor can be determined and also displayed based on the spatial distribution of the capacitance. In addition, such an arrangement also provides improved information about the relative spatial arrangement of the electrodes, since any deviation from a mutual parallel alignment or a relative parallel displacement of the electrodes relative to one another can be readily observed and can therefore be taken into account when evaluating the measurement signals. Furthermore, the spatially resolved measurements and the detected relative position or change in position of the electrodes can also be used to recognize fatigue of the capacitive sensor; to assess the reliability of the measurement itself, and to also estimate the remaining lifetime of the sensor. The sensor of the invention can then be replaced with a functional sensor before a malfunction may indeed occur.

With the spatially structured electrode which includes a plurality of electrode elements that are spaced apart from each other and arranged in a two-dimensional pattern, the measurement results can be spatially resolved. By arranging the electrode elements in the two dimensions, the measurement results can be spatially resolved not only in one direction, but in a plane that is defined by the surface of the substrate. The individual electrode elements may be advantageously arranged in form of a checkerboard pattern and may be identical with respect to their physical properties (size, material, and so on).

The measurement signals derived from the individual elements are essentially identical if the counter electrode has comparable characteristic properties, so that the signals can be easily evaluated to provide the desired spatial resolution. Consequently, the difference in the measurement signals is essentially determined by the spatially differentiated structure of the quantity to be measured and/or by the spatially changing structure of the sensor itself. Although the surface area of the elements is reduced by the two-dimensional arrangement of the electrode elements, causing a proportional reduction in the measurement capacitance, this disadvantage can be overcome by a suitable choice of the signal amplifiers and/or the electronic processing unit. This disadvantage, however, is acceptable, if a two-dimensional spatially differentiated measurement signal is desired.

According to one advantageous embodiment of the invention, the spatially structured electrode is formed of several mutually parallel stripes. By arranging the differentiated spatial structure in the form of parallel stripe-shaped elements, a spatial resolution corresponding to the two-dimensional spacing between adjacent stripe-shaped element can be attained. In addition, the surface area and therefore also the capacitance of the stripe-shaped elements can be made quite large, thereby improving the reliability of the measurement signals. The capacitance is proportional to the area of the stripe-shaped element. Consequently, the capacitive measurement signal may subsequently require only a small amount of signal amplification, which improves the signal-to-noise ratio of the spatially differentiated measurement signal.

According to another advantageous embodiment of the invention, the spaced-apart elements arranged in a two-dimensional pattern may have the form of circles or rectangles. With this arrangement of the electrode elements, the elements can be closely spaced to provide a large surface coverage. This would not be possible if the shape of each element were selected individually. Circularly or rectangularly shaped electrode elements arranged in a two-dimensional arrangement therefore advantageously have large capacitance values which improves the signal quality and the overall reliability of the measurements.

According to yet another embodiment of the invention, an electronic circuit for processing the measurement signals is integrated with one of the substrate members, wherein the integrated circuit is preferably located underneath the electrode of the respective substrate member. With this integration, in particular in the vertical direction, of the capacitive sensor with the electronic circuit for processing the measurement signals, the space taken up by the sensor is used much more efficiently. Consequently, the overall footprint of the system decreases proportional to the increased packing density of the entire system, which includes the capacitive sensor and the electronic processing unit. In addition, the length of the signal path that the measurement signals of the capacitive sensor have to travel, is also reduced. This feature reduces possible interference and improves the accuracy of the quantities to be measured and processed by the capacitive sensor.

According to yet another advantageous embodiment, the integrated electronic circuit includes devices which can separately process the measurement signal having the spatial resolution. The devices are preferably arranged in close proximity to the individual electrode elements of the spatially structured electrode. In this way, the spatially resolved signals can be processed with devices that are identical or at least substantially identical, so that the measurement signals can be processed by a cascaded electronic system. The cascaded arrangement can be expected to reduce not only the costs of developing such a signal processing system, but also the expenses associated with a potential malfunction of the spatially resolving processor units, since this system is more complex and may fail more frequently than conventional capacitive sensors. Moreover, a common central processor that receives the signals processed by the individual devices, can be used for commonly processing the measurement signals, since each of the measurement signals is generated by a processing unit having an identical or essentially identical processor characteristics. The close proximity between the electrode elements and the processing devices also minimizes possible signal losses. Consequently, the decrease in the surface area of the individual electrode elements is not significant in view of the ability to produce a spatially differentiated measurement signal.

According to still another embodiment of the invention, the electronic circuit and/or devices capable of processing signals with a spatial resolution may include amplifier devices that are preferably arranged proximate to the electrode elements of the spatially structured electrode. In this case, the un-amplified measurement signal travels only a very short signal path to the respective signal amplifier or signal processor associated with the element. The amplified measurement signal, on the other hand, which is less susceptive to interference, can be routed to a distal electronic circuit for processing, without suffering a large signal loss. The distal electronic circuit is preferably implemented as a central electronic circuit serving a plurality of amplifier devices.

According to yet another advantageous embodiment, the second substrate member of the sensor in the region of the electrode is formed as a deformable membrane, with the electronic circuit integrated in the first substrate member. In this way, the electronic circuit is not affected when the membrane is deformed during the measurement. Separating the electronics in this way also improves the long-term stability of the sensor, since a deformation of the membrane in the region of an electronic circuit that is integrated in the region proximate to the membrane, can cause microscopically small cracks, which may damage the electronic structures inside the substrate member and cause the sensor to fail.

According to yet another embodiment of the invention, a first portion of the electronic circuit for processing the measurement signals may be located in the first substrate member and a second portion of the electronic circuit is arranged in the second substrate member. The electronic circuit can thus be divided among the two substrate members, so that the electronic circuit integrated with the capacitive sensor has a significantly improved functionality. This is of particular importance when the measurement signals are spatially resolved with a higher resolution. Advantageously, the devices for spatially resolved processing of the spatially resolved measurements may be arranged in the first substrate member which includes the spatially structured electrode, whereas the remaining electronic circuit for commonly processing the measurement signals may be located in the other substrate member. This arrangement tends to further reduce the interference between the different portions of the electronic circuit that are housed in the different substrate members.

According to yet another advantageous embodiment of the invention, at least one of the electrodes or at least a portion of the electrodes may be formed of a conductor path of the electronic circuit that processes the measurement signals. In this way, the electrodes do not require separate conductive surfaces in addition to the existing conductor paths of the electronic circuit, thereby eliminating the need for an additional metalization plane on the substrate member during the manufacture of the sensor. By synergetically using the conductor paths of the electronic circuit also for the electrodes, the internal component structure of the sensor of the invention can be optimized.

According to another advantageous embodiment of the invention, the sensor may include a damping system that is capable of preventing oscillations of the membrane at least to a degree where oscillations of the membrane do not adversely affect the measurement result. An oscillation of the membrane can be damped by filling a region of the moveable membrane with a material which resists a rapid change in position of the membrane that occur during a brief time interval. This can be achieved, for example, by filling the region with a liquid with a predetermined, not too high viscosity. The membrane may also be equipped with reinforcements or ribs, which prevent the membrane to oscillate in a predetermined frequency range by shifting the resonance frequency of the membrane into a frequency range that is substantially different from the frequency range of an expected particular applied force. The membrane can also be provided with a permanent magnet, wherein an external magnetic field acting on the magnet may counteract a deflection of the membrane caused by an oscillation. Such a damping is particularly advantageous when the spatial distribution of the measurement signal is to be analyzed, since elimination of oscillations increases the accuracy and resolution of the. measurement signal. Other characteristic parameters, such as the expected residual lifetime of the sensor and the quality of the spatially differentiated measurements results and the like, can also be more reliably determined.

According to yet another advantageous embodiment of the invention, the sensor may be made of the semiconductor material, in particular, silicon. The capacitive sensor and the integrated electronic processing devices can then be most advantageously implemented. In addition, the advantageous mechanical properties of silicon facilitate formation of the membrane. The sensor may be formed as a pressure, force or acceleration sensor. A pressure, a force or an acceleration deforms the membrane and causes a displacement of the electrode position. The direction and the type of the external force that acts on the membrane, affects the spatial distribution of the measurement signal. For example, a force with a direction normal to the membrane does not cause a lateral displacement of the membrane, whereas a force that attacks at an angle, may cause a lateral displacement of the membrane. The measurement signal is therefore differentiated, since different elements of the spatially structured electrode contribute to the formation of the measurement signal. Unlike conventional pressure sensors based on capacitive sensors, the portion of the pressure that is received by the second substrate member and does not cause the distance between the electrodes to change, can now be evaluated and taken into account during signal processing. Based on the spatially differentiated information, the actual magnitude and direction of the force applied from the outside can be determined. The sensor of the invention therefore provides much more differentiated measurements.

According to another advantageous embodiment of the invention, the capacitive sensor can be used for sensing magnetic fields. Such a magnetic field sensor may include a permanent magnet disposed in the region of the membrane, wherein the position of the magnet changes in response to an external magnetic field, the field strength of which is to be determined. The magnitude and the direction of the magnetic fields can be determined based on the spatially resolved information and can be outputted or displayed as a magnetic field strength.

The spatially resolved measurement is also capable of resolving and displaying spatially differentiated patterns between the electrodes that form the measurement capacitance. In this way, the flow profile of a liquid or gas flowing through the capacitive sensor can be determined. The flow velocity and/or the total flow can also be determined by measuring the pressure changes along the flow path of the material through the device.

Further features and advantages of the present invention will be apparent from the following description of preferred embodiments and from the claims.

DETAILED DESCRIPTION OF PREFERRED EMBODIMENTS

Figure 1:
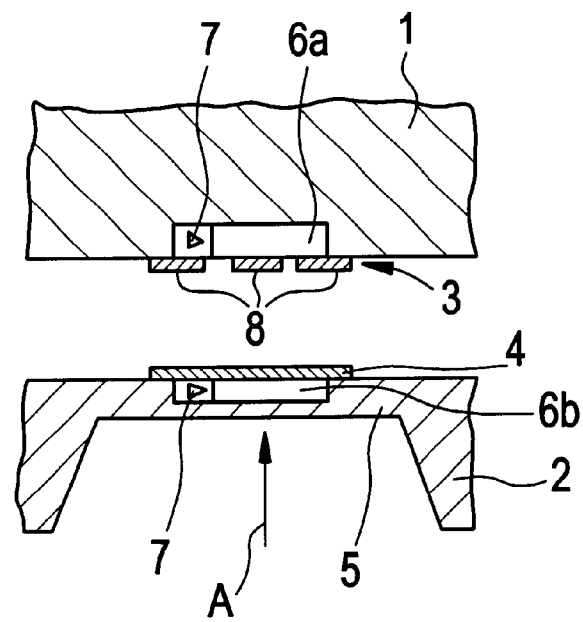
FIG. 1 is a schematic diagram of an embodiment according to the invention.

FIG. 1 shows a capacitive sensor which includes a first substrate member 1 and a second substrate member 2. A first electrode 3 is. arranged on the first substrate member 1 and a second electrode 4 is arranged on the second substrate member 2 in such a way, that the electrodes are spaced apart from each other and form a measurement capacitance.

Figure 4:
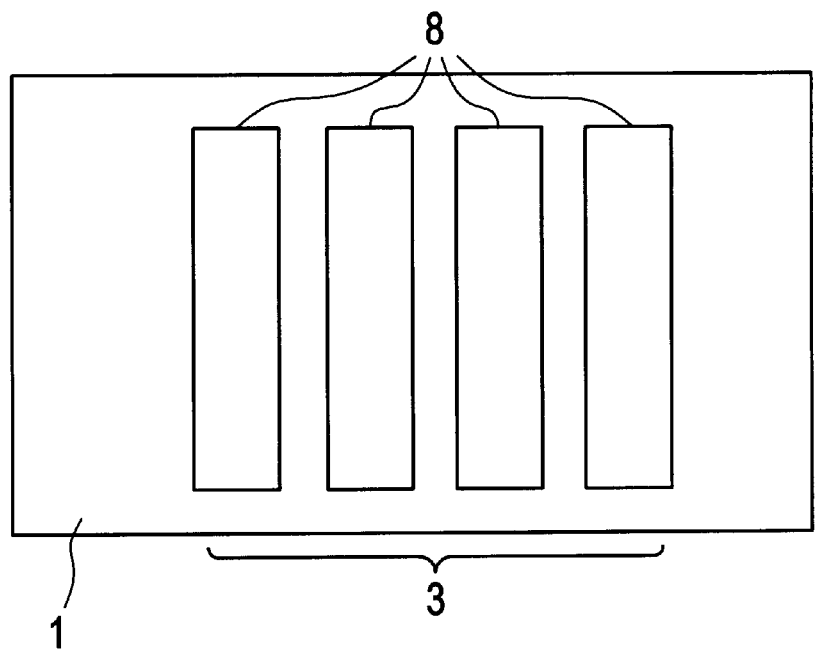
FIG. 4 is a top view of the embodiment of FIG. 1.

The second substrate member 2 is formed to include a membrane 5 in the region of the second electrode 4, wherein the membrane 5 deforms in response to an applied pressure. The pressure is typically applied to the membrane 5 in the direction of the arrow A, thereby deforming the membrane. The first electrode 3 is spatially structured to allow spatially resolved measurements. The first electrode 3 includes mutually parallel striped-shaped electrode elements 8 as depicted in FIG. 4. Each of these striped-shaped electrode elements 8 cooperates with the second electrode 4 to form a specific measurement capacitor. Together, the measurement capacitances form the spatially structured measurement signals that provide the spatial resolution. The spatially differentiated measurement signal is processed separately for each electrode element 8 in a first electronic signal processing unit 6a arranged underneath the electrode 3. Amplifier elements included in the electronic processing unit 6a amplify the measurement signals received from the individual stripe-shaped elements 8 and differentiates the signals according to the spatial structure of the elements 8. The measurement signals are supplied to and processed into final form in a second electronic processing unit 6b which is integrated in the second substrate member 2 underneath the second electrode 4. Together, the two electronic processing units 6a, 6b form the complete electronic circuit for processing the measurement signals with a spatial resolution.

As mentioned above, the electronic processing units 6a, 6b that process the signals received from the electrodes 3, 4, are arranged in the substrate members 1, 2 in close proximity to the electrodes 3, 4. The available space for the capacitive sensor is thereby used effectively, thereby reducing the size of the entire system. In addition, the signal paths extending from the capacitive electrodes to the electronic processing units 6a, 6b and, in particular, to the integrated devices in these units, are shortened significantly, so that the measurement signals can be reliably evaluated.

If the pressure or the external force is not applied in the center and perpendicular to the membrane 5 as illustrated ideally by the arrow A, but also in the marginal region and at an angle to the direction of the arrow A, then the second electrode 4 becomes displaced along its major surface. In addition, the membrane 5 together with the second electrode 4 arranged on the membrane is also deflected out of a plane defined by the second electrode 4 in FIG. 1. As a result, the electrode 4 then overlaps either more or less with the corresponding striped-shaped elements of the first electrode 3. The gap between some of the elements 8 and the second electrode 4 also decreases, whereas the gap between other electrode elements 8 and second electrode 4 increases. This is caused by the tilt of the second electrode 4 with respect to the membrane 5. Spatial anomalies of this type can be detected and evaluated by the spatial structure of the first electrode 3 which has the elements 8, and the associated electronic processing units 6a, 6b that process the measurement signals. With the spatially resolved measurements described above, the magnitude and details of the displacement can be determined, so that the actually applied external force, rather than only a component of the force, can be measured. In addition, changes in the elasticity of the membrane can be detected, so that the projected lifetime of the membrane and the useful life of the sensor can be estimated.

In the illustrated embodiment, the substrate members are made of silicon, facilitating integration of the electronic processing units 6a, 6b . In addition, the mechanical properties of silicon are particularly suited for forming the deformable membrane 5.

Figure 2:
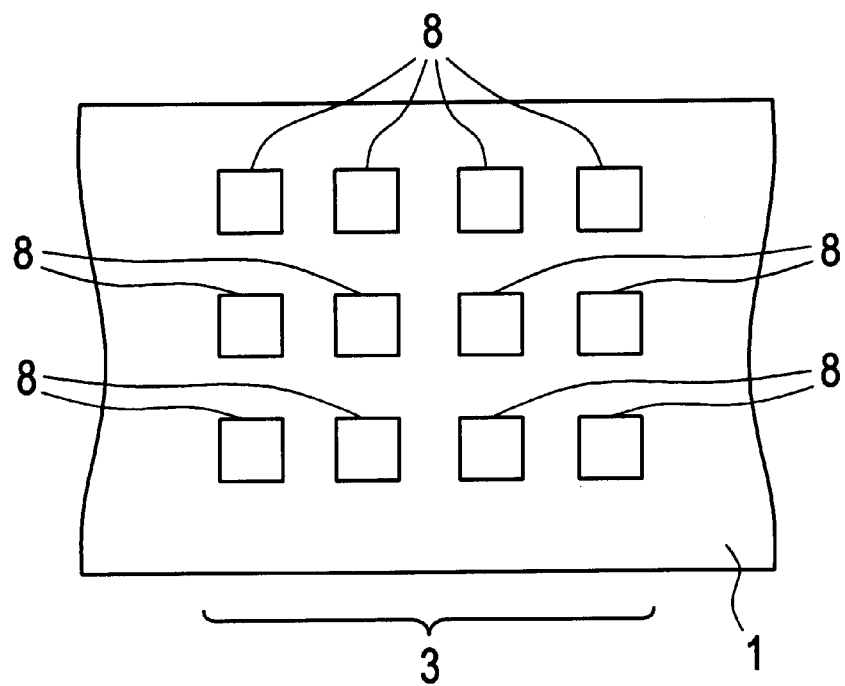
FIG. 2 is a schematic diagram of a substrate member with a spatially structured electrode.
Figure 5:
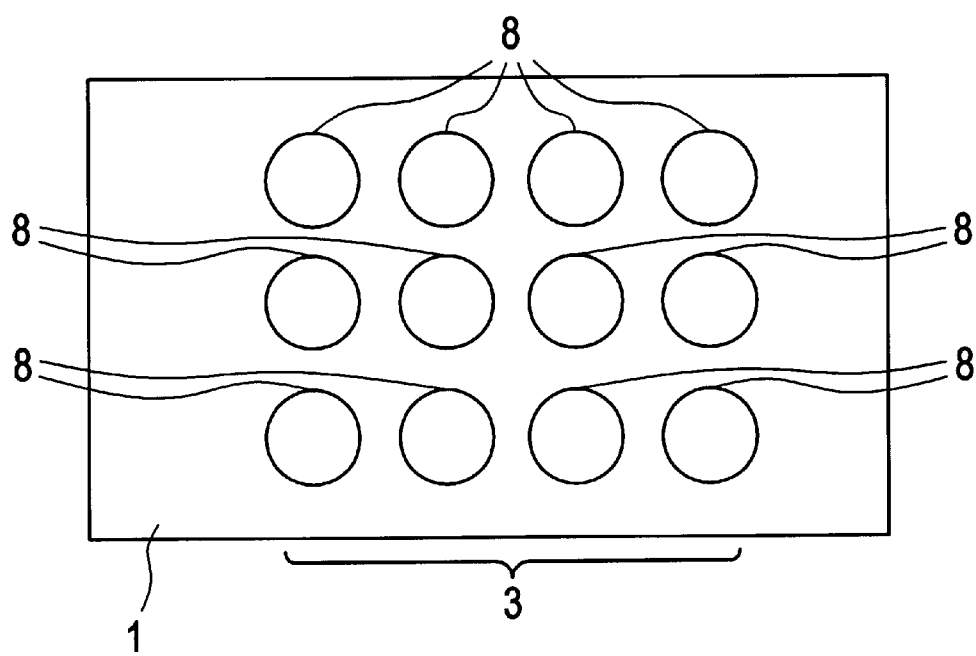
FIG. 5 is an alternate embodiment of a spatially structured electrode

FIG. 2 is a schematic top view of a plurality of spaced apart elements 8 which together form a spatially structured electrode 3. The spatially structured electrode 3 is arranged on the substrate member 1. The spatially structured electrode 3 is implemented in form of twelve elements 8 which are arranged in a two-dimensional checker-board type structure. The individual elements 8 spaced apart from respective adjacent element 8 so as not to interfere with each other. The twelve elements 8 have a rectangular structure. The elements have identical surface areas and within the checkerboard arrangement are uniformly spaced from respective adjacent elements 8. This arrangement provides a cost-effective dense packing of the twelve individual elements 8 of the electrode 3. An alternative electrode structure with circular electrode elements is depicted in FIG. 5. Furthermore, this arrangement does not require electrical connections to the individual elements 8 of the electrode 3 on the surface of the substrate member 1. In this way, there are no wires that can interfere with the elements 8, in particular with adjacent elements 8. Since no space is taken up by surface wires, the surface area of the elements 8 can be increased significantly, which in turn increases the measuring signals of the individual element 8.

Figure 3:
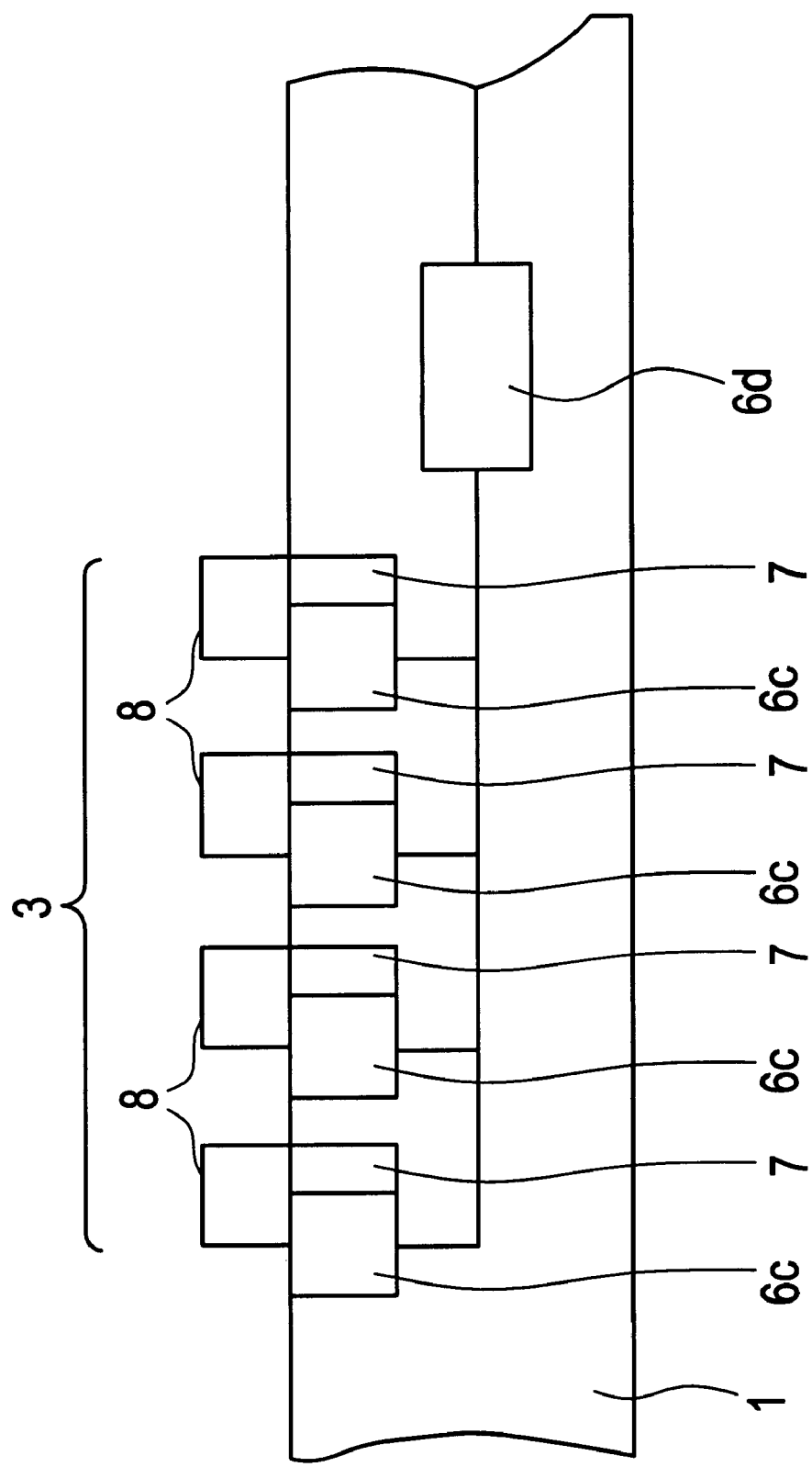
FIG. 3 is a schematic diagram of the substrate member of FIG. 2 with the spatially structured electrode and an electronic circuit.

FIG. 3 shows a vertical arrangement of the substrate member 1 with the electrode 3 of FIG. 2. Four electrode elements 8 of the spatially structured electrode 3 are shown. The electrode elements 8 are arranged on the surface of the substrate member 1. An electronic processing unit 6c which is located inside the substrate member 1, is associated with each electrode element 8. Each of the electronic processing units 6c includes an amplifier device 7, so that the measurement signal of each electrode element 8 only has to travel a very short distance before being amplified in the signal amplifier device 7 and processed by the electronic processing unit 6c. The measurement signal from each electrode element is processed separately by the associated amplifier device until the processed signal reaches a certain signal strength, in order to keep signals from different locations separate. The processed measurement signals are supplied to a common electronic processing unit 6d, which combines several pre-processed measurement signals derived from the electrode elements 8 and evaluates the pre-processed signals according to the spatial characteristics of the individual electrode elements 8. The exemplary arrangement illustrated in FIG. 3 shows the modular design of the first electrode 3 with several individual modules that include the electrode element 8 with the electronic processing unit 6c, with the signal amplifier device 7 and with the common central electronic processing unit 6d which evaluates the pre-processed measurement signals. The described cascaded modular design can be manufactured easily and cost-effectively.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. Capacitive sensor comprising:
    a first electrode; and
    a second electrode remote from the first electrode and facing the first electrode, the first and second electrode forming a measurement capacitance;
    the first electrode comprising at least three spaced-apart electrode elements arranged in a two-dimensional pattern to form an electrode structure having a spatial resolution,
    a plurality of pre-processors, each pre-processor associated with a respective one of the at least three spaced-apart electrode elements;
    a signal of each electrode element being pre-processed by a respective one of the plurality of pre-processors according to a spatial characteristic of the respective electrode element; and
    a common processor receiving the pre-processed signals from the pre-processor;
    wherein each of the electrode elements cooperates with the second electrode to form a respective measurement dependent capacitor.

2. Capacitive sensor according to claim 1, further comprising: a first substrate member supporting the first electrode: a second substrate member supporting the second electrode.

3. Capacitive sensor according to claim 2, further comprising:
    a plurality of first electronic circuits disposed on the first substrate member, each first electronic circuit associated with a respective one of the electrode elements,
    wherein each first electronic circuit separately pre-processes the signal of the associated electrode element.

4. Capacitive sensor according to claim 3,
    wherein a region of the second electrode the second substrate member is formed as a deformable membrane.

5. Capacitive sensor according to claim 4, wherein at least one of the substrate members is made of silicon.

6. Capacitive sensor according to claim 3, further comprising a second electronic circuit integrated in the first substrate member, wherein the second electronic circuit receives the pre-processed signals from the first electronic circuits and processes the pre-processed signals to supply a spatially resolved output signal.

7. Capacitive sensor according to claim 3, wherein at least one of the electrodes is formed of a conductor section of the electronic circuit.

8. Capacitive sensor according to claim 3, wherein the electronic circuit is arranged underneath the electrode of the substrate member on which the electrode is disposed.

9. Capacitive sensor according to claim 3, wherein the electronic circuit comprises circuit elements capable of producing a measurement signal having a spatial resolution.

10. Capacitive sensor according to claim 9, wherein the circuit elements are associated with respective spaced-apart electrode elements.

11. Capacitive sensor according to claim 2, wherein the second substrate member in the region of the second electrode comprises a deformable membrane.

12. Capacitive sensor according to claim 11, wherein the membrane is equipped with reinforcements or ribs preventing the membrane from oscillating.

13. Capacitive sensor according to claim 11, wherein the membrane is provided with a permanent magnet, wherein an external magnetic field acting on the magnet may counteract a deflection of the membrane caused by an oscillation.

14. Capacitive sensor according to claim 11, wherein the sensor further comprises a damping system capable of preventing the membrane from oscillating.

15. Capacitive sensor according to claim 2, wherein said pre-processor is disposed in said substrate member.

16. Capacitive sensor according to claim 1, wherein the spaced-apart elements of the electrode structure are formed as mutually parallel stripes.

17. Capacitive sensor according to claim 1, wherein the spaced-apart elements are arranged in the form of a checkerboard.

18. Capacitive sensor according to claim 1, wherein the spaced-apart elements comprise circular elements.

19. Capacitive sensor according to claim 1, wherein the spaced-apart elements comprise rectangular elements.

20. Capacitive sensor according to claim 1, wherein the spaced-apart elements comprise polygons.

21. Use of the sensor of claim 1 for sensing at least one of a pressure, a force, an acceleration, a magnetic field and a flow rate.

22. Capacitive sensor according to claim 1, wherein the common processor provides a spatially resolved output signal according to values of the pre-processed signals.

23. Capacitive sensor system comprising:
    a substrate member
    a first electrode disposed on the substrate member;
    a second electrode remote from the first electrode and facing the first electrode,
    the first electrode comprising at least three spaced-apart electrode elements arranged in a two-dimensional pattern to form an electrode structure having a spatial resolution, each of the electrode elements cooperating with the second electrode to form a respective measurement-dependent capacitor;
    a plurality of pre-processors, each pre-processor located inside the substrate member and associated with a respective one of the at least three spaced-apart electrode elements; and
    a common processor receiving pre-processed measurement signals from the plurality of pre-processors and providing a spatially resolved output signal according to values of the pre-processed measurement signals.

24. Capacitive sensor comprising:

a plurality of spaced-apart circuit elements adapted to process independent input signals into separate output signals;

a plurality of first electrodes formed on said circuit elements and providing the input signals;

a plurality of pre-processors, each pre-processor associated with a respective one of the plurality of spaced-apart circuit elements;

a common processor receiving pre-processed signals from the plurality of pre-processors and providing a spatially resolved output signal according to values of the pre-processed signals; and at least one second electrode disposed on a second sudstrate, said second electrode in cooperation with a first electrode forming a respective capacitor, wherein said capacitors produce output signals having a spatial resolution.

25. Capacitive sensor comprising:

a housing having at least one opening connected to a reservoir providing at least one of a flow and pressure;

a first electrode;

a second electrode remote from the first electrode and facing the first electrode, the first and second electrode forming a measurement capacitance, wherein at least one of the first and second electrode comprises a plurality of spaced-apart electrode elements which are arranged in a two-dimensional pattern to form an electrode structure to spatially resolve at least one of the flow and the pressure;

a plurality of pre-processors, each pre-processor associated with a respective one of the plurality of spaced-apart circuit elements; and a common processor receiving pre-processed signals from the plurality of pre-processors and providing a spatially resolved output signal according to values of the pre-processed signals.

\* \* \* \* \*

UNITED STATES PATENT AND TRADEMARK OFFICE
CERTIFICATE OF CORRECTION

PATENT NO. : 6,425,289 B1
DATED : July 30, 2002
INVENTOR(S) : Guenter Igel, Ulrich Sieben, and Juergen Giehl It is certified that error appears in the above-identified patent and that said Letters Patent is hereby corrected as shown below:

Column 1,
Line 46, replace "itself," with -- itself; --.

Column 4,
Line 23, replace "the." with -- the --.

Column 9,
Line 17, repalce "sudstrate" with -- substrate --.

Signed and Sealed this

Seventh Day of January, 2003

JAMES E. ROGAN
*Director of the United States Patent and Trademark Office*